United States Patent [19]

Sokolovsky et al.

[11] Patent Number: 4,730,973
[45] Date of Patent: Mar. 15, 1988

[54] AUTOMATIC UNLOADING MECHANISM

[75] Inventors: Paul J. Sokolovsky, Sunnyvale; Huyhn W. Tan, San Jose, both of Calif.

[73] Assignee: Advanced Micro Devices, Inc., Sunnyvale, Calif.

[21] Appl. No.: 21,960

[22] Filed: Mar. 5, 1987

[51] Int. Cl.$^4$ ............................................. B65G 65/23
[52] U.S. Cl. ..................................... 414/421; 414/786
[58] Field of Search ................. 198/592; 414/421, 419, 414/786

[56] References Cited

U.S. PATENT DOCUMENTS

| | | | |
|---|---|---|---|
| 2,119,642 | 6/1938 | McClatchie | 414/421 |
| 2,835,398 | 5/1958 | Temple et al. | 414/421 |
| 2,858,949 | 11/1958 | Doepke et al. | 414/421 |
| 2,872,058 | 2/1959 | Doepke et al. | 414/421 |
| 3,353,652 | 11/1967 | Fellner, Jr. | 198/592 X |
| 4,575,301 | 3/1986 | Lodi et al. | 414/421 X |

Primary Examiner—Leslie J. Paperner
Assistant Examiner—Stuart J. Millman
Attorney, Agent, or Firm—Patrick T. King; Davis Chin

[57] ABSTRACT

An unloading mechanism for unloading automatically a box, includes an endless conveyor belt with a conveyor beld extension for transporting a box to be unloaded. A cage device is used to receive the box to be unloaded from the conveyor belt. Air cylinder actuators are operatively connected to the belt extension for pivoting downwardly the belt extension in order to permit rotation of the cage device. Rotary air cylinders are operatively connected to the cage device for rotating the cage device through approximately 165° in a first direction in order to unload the contents of the box into a hopper.

18 Claims, 8 Drawing Figures

AUTOMATIC UNLOADING MECHANISM

DESCRIPTION

BACKGROUND OF THE INVENTION

This invention relates generally to material handling apparatus and more particularly, it relates to an unloading mechanism for receiving boxes of tubes from a conveyor belt and for transporting the boxes to a location so that the tubes can be unloaded automatically out of the boxes into a hopper for marking of IC units and the like and for singulating the tubes.

In the past, boxes of tubes containing parts such as IC units to be marked and placed in a singulated fashion have been unloaded manually and then positioned into a hopper for subsequent marking. To applicants' knowledge, there has not been developed heretofore an unloading mechanism like that of the present invention which allows for the automatic unloading of tubes out of the boxes from a conveyor belt into a hopper for marking of IC units and for tube singulation. Such automatic unloading mechanism is desirable because it eliminates the need of an operator, as has been required heretofore, to manually unload the boxes, thereby reducing labor costs and thus increasing the overall production efficiency.

SUMMARY OF THE INVENTION

Accordingly, it is a general object of the present invention to provide a relatively simple and reliable unloading mechanism for unloading automatically tubes out of a box, which has been traditionally unavailable.

It is an object of the present invention to provide an unloading mechanism for unloading automatically a box which includes a cage device for receiving the box to be unloaded from a conveyor belt and means for rotating the cage device through approximately 165° in a first direction in order to unload the box into a hopper.

It is another object of the present invention to provide an unloading mechanism for unloading automatically a box which includes a conveyor belt with a conveyor belt extension for transporting a box to be unloaded and means for pivoting downwardly the belt extension so as to permit rotation of a cage device.

It is still another object of the present invention to provide an unloading mechanism for unloading automatically a box which includes limiting means for limiting the rotation of a cage device to be approximately 165°.

In accordance with these aims and objectives, the present invention is concerned with the provision of an unloading mechanism for unloading automatically a box which includes a conveyor belt with a belt extension for transporting a box to be unloaded. A cage device is operatively connected to the belt extension for receiving the box to be unloaded from the conveyor belt. Air cylinders are operatively connected to the belt extension for pivoting downwardly the belt extension in order to permit rotation of the cage device. Rotary actuators are operatively connected to the cage device for rotating the cage device through 165° in a first direction in order to unload the box into a hopper.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
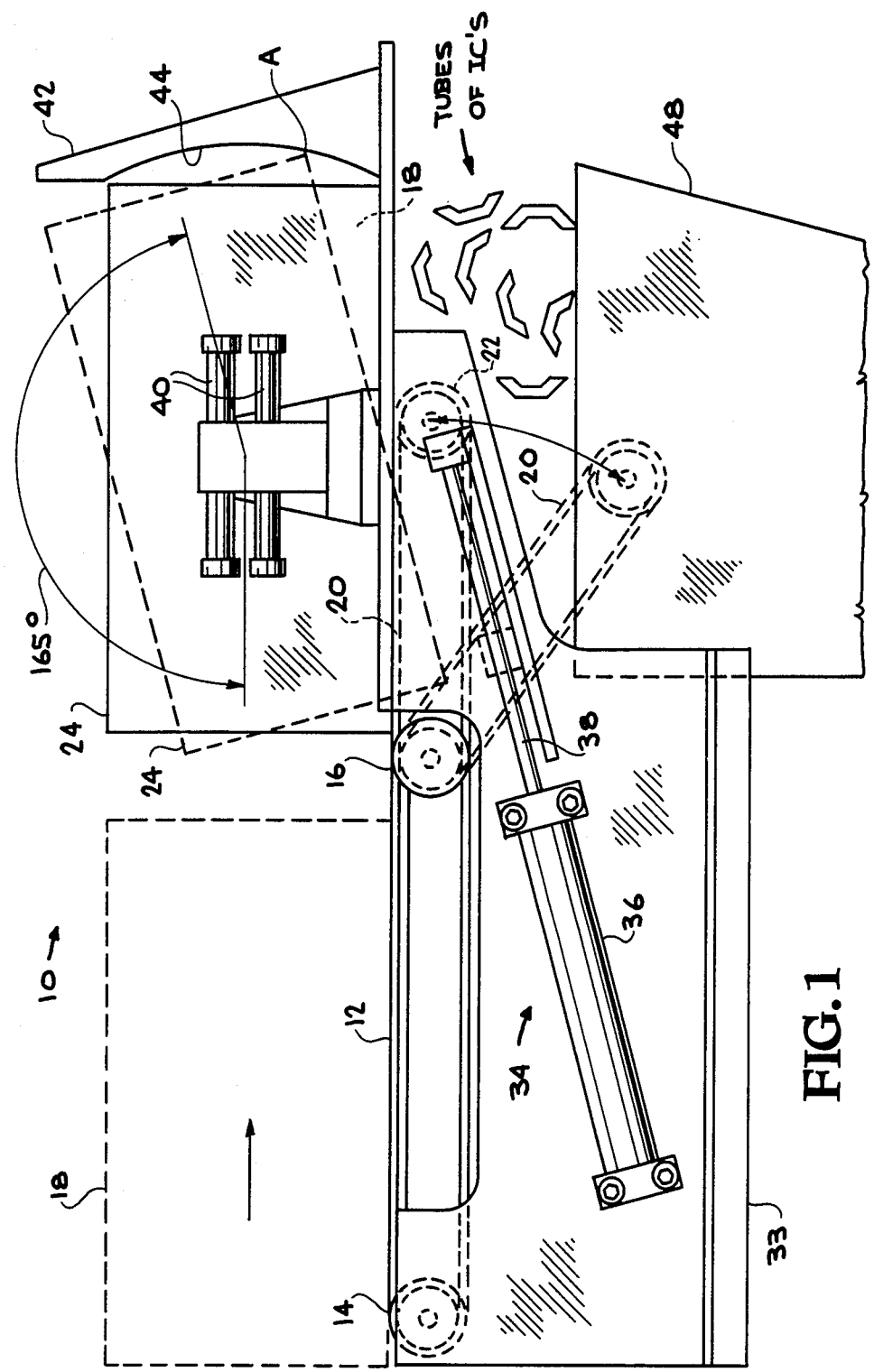
FIG. 1 is a simplified diagrammatical side elevational view of the unloading mechanism constructed in accordance with the principles of the present invention.

Referring now in detail to the various views of the drawings, there is shown in FIG. 1 a simplified diagrammatic side elevational view of an automatic unloading mechanism 10 which is constructed in accordance with the principles of the present invention. The automatic unloading mechanism includes an endless conveyor belt 12 disposed laterally around spaced-apart drive rollers 14 and 16 for transporting a box 18 filled with tubes, the tubes containing parts such as IC units which are to be subsequently marked. A conveyor belt extension 20 is formed with the conveyor belt 12 and is disposed laterally around the spaced-apart rollers 16 and 22. The conveyor belt 12 with the belt extension 20 is used to feed the box 18 into a rotatable cage device 24. It should be understood that the drive rollers 14 and 16 may be suitable driven by a reversible motor (not shown) for advancing the box 18 into the cage device 24 and for retracting the box from the cage device depending upon the direction of rotation of the rollers.

Figure 2:
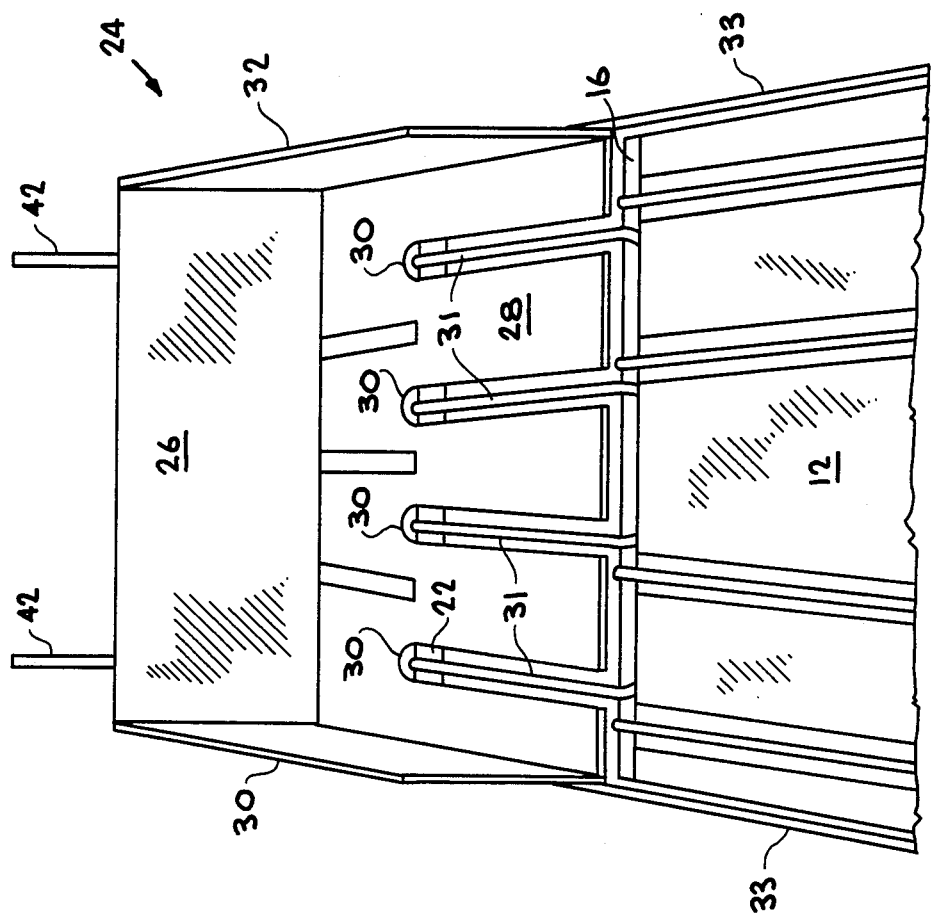
FIG. 2 is a top plan view of the cage device for use in the unloading mechanism of the present invention.

As can be best seen from FIG. 2, the cage device 24 is a unitary structure having a generally rectangular configuration. The cage device 24 is formed with a back side panel 26, a bottom side panel 28, and a pair of side panels 30 and 32. The cage device has open front and top sides. The bottom side panel 28 is mounted above the surface of the conveyor belt extension 20. The bottom side panel 28 is provided with a plurality of elongated U-shaped slots 29 for receiving corresponding extension feed cables 31 which are rotatable about the rollers 16 and 22. The side panels 26–32 are dimensioned so as to accommodate and receive therein the box 18. The conveyor belt extension 20 is adapted to be rotated or pivoted downwardly about the drive roller 16 to the position shown in phantom in FIG. 1. This pivotal movement is achieved by a pair of air cylinder actuators 34, 34a, each consisting of a power cylinder 36 and a reciprocating rod 38. The air cylinder actuators 34–34a are suitably mounted on the sides of a conventional conveyor frame structure 33 and below the surface of the conveyor belt 12. The reciprocating rod 38 can be selectively moved toward and away from the power cylinder 36 so as to lower and raise the conveyor belt extension 20.

The cage device 24 is adapted to be rotated relative to the horizontal plane of the conveyor belt 12 approximately 165° to the position shown in phantom in FIG. 1. This rotational movement is achieved by rotary actuators or air cylinders 40 which are mounted on the outer surfaces of the respective side panels 30 and 32. In order to limit the rotation of the cage device to be approximately 165° and thus prevent the box 18 from falling out of the cage device when the box 18 is in the upside down position, a pair of guide members 42 are suitably arranged downstream of the conveyor belt extension 20. Each of the guide members 42 is formed of a vertical panel having a concave cut-out portion 44. The concave cut-out portions 44 face the outer surface of the back side panel 26 of the cage device. At the end of the approximately 165° rotation, the upper ends of the cage device and the box come to reset at point A on the respective concave cut-out portions 44 so as to limit the extreme rotational movement thereof. The contents or parts in the box 18 will be discharged or dumped into a hopper 48 which is positioned below the surface of the conveyor belt extension 20.

Figure 3:
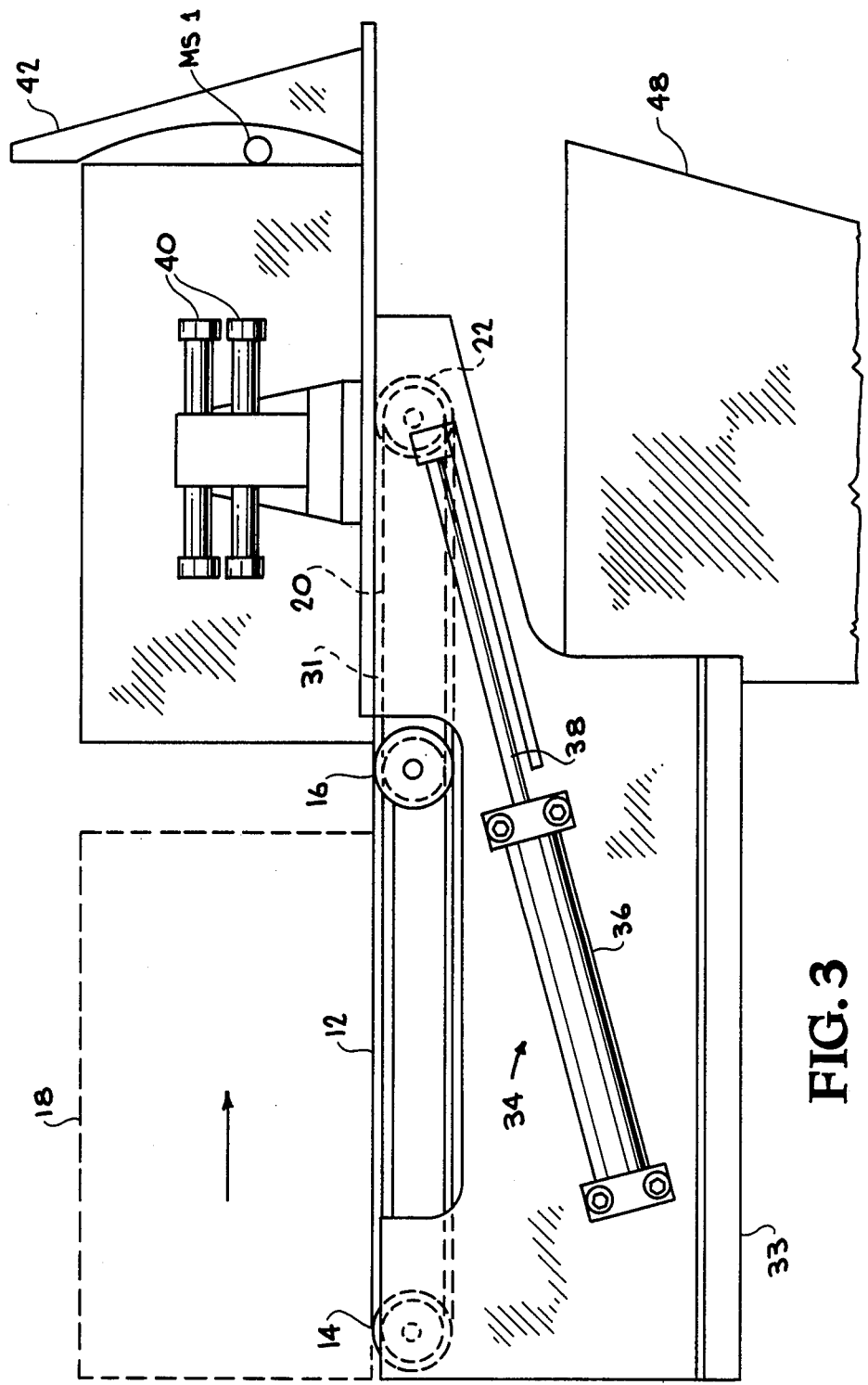
FIGS. 3–7 illustrate the sequence of operation of the automatic unloading mechanism of the present invention.
Figure 4:
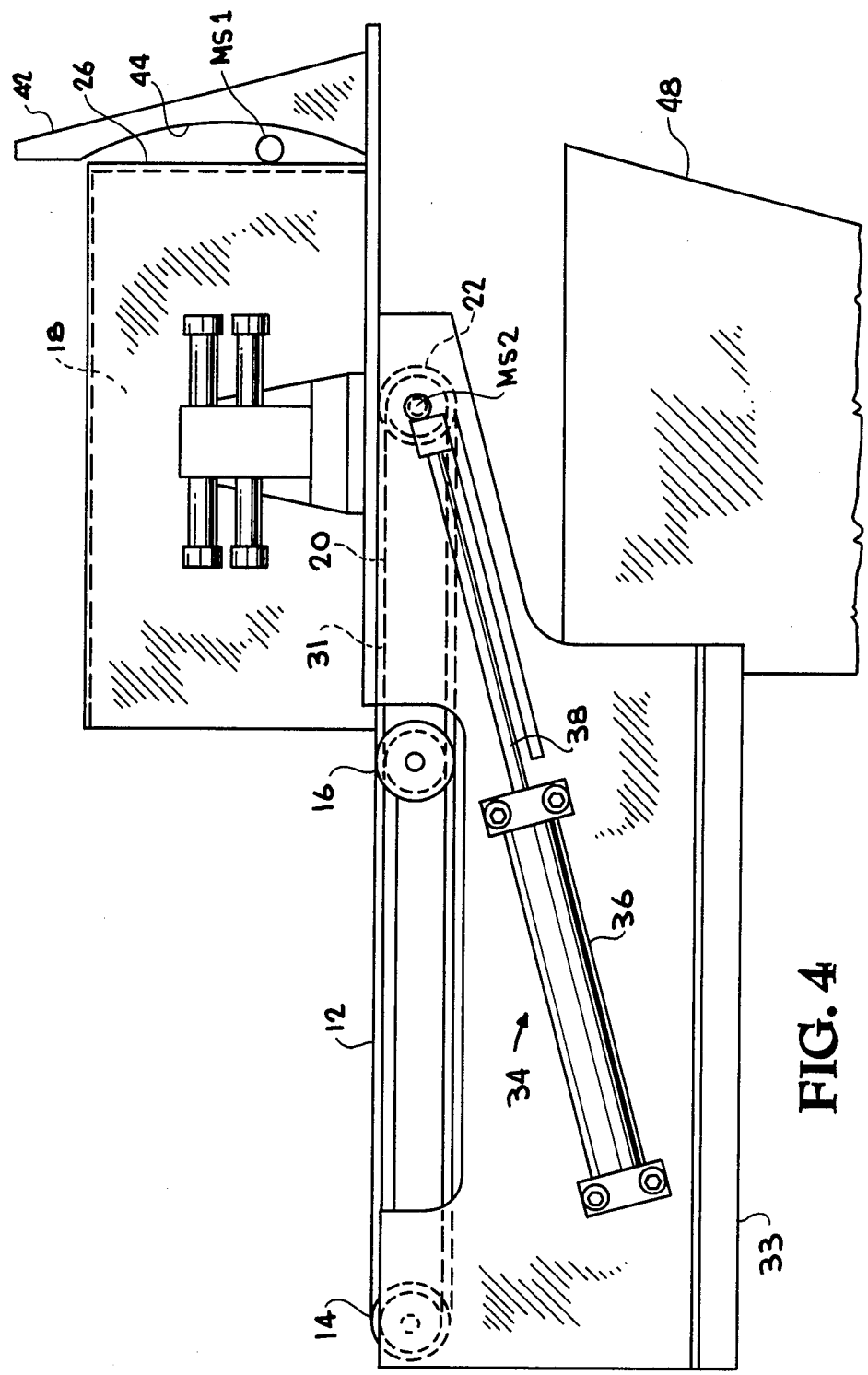
Figure 5:
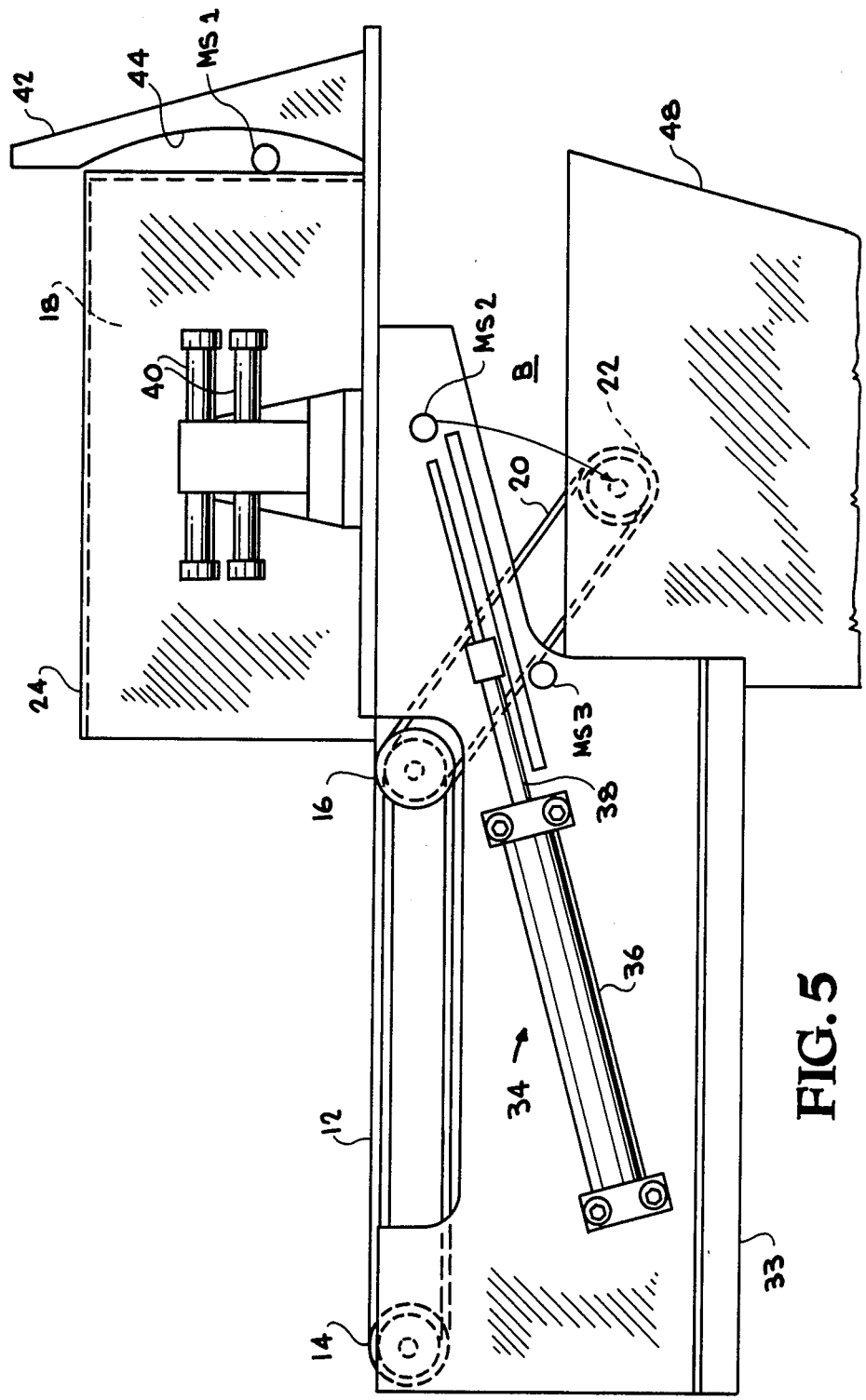
Figure 6:
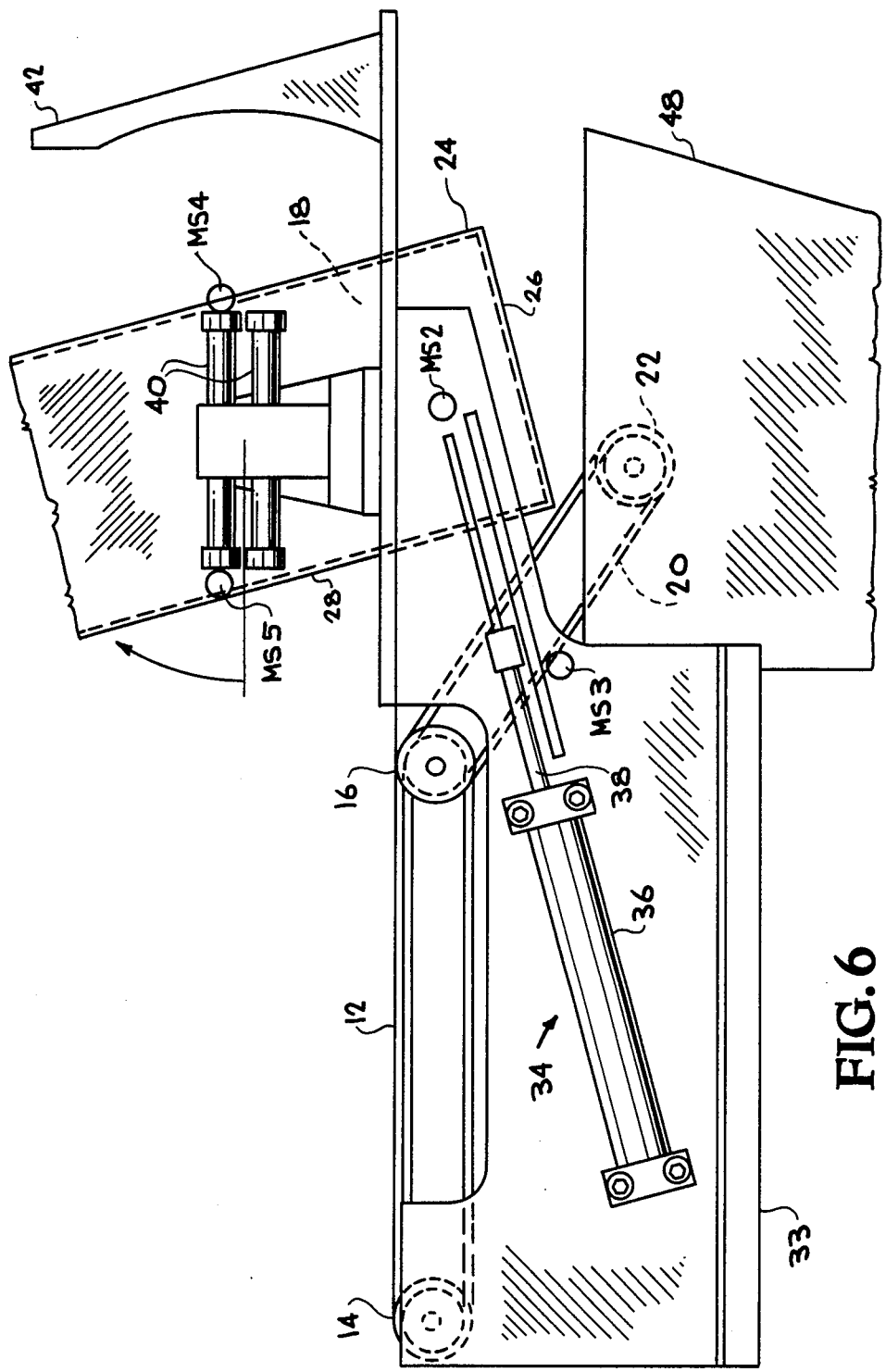
Figure 7:
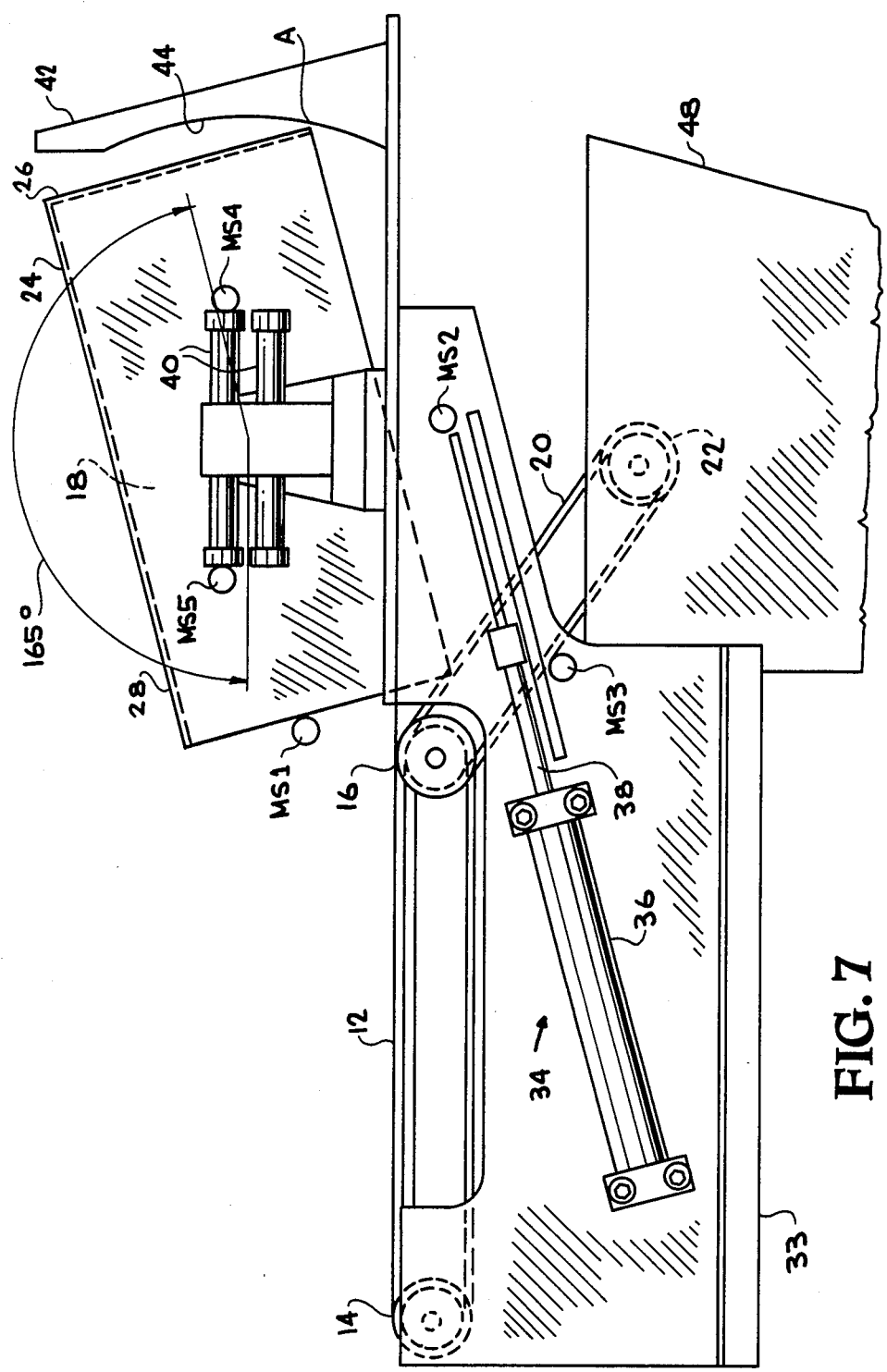
Figure 8:
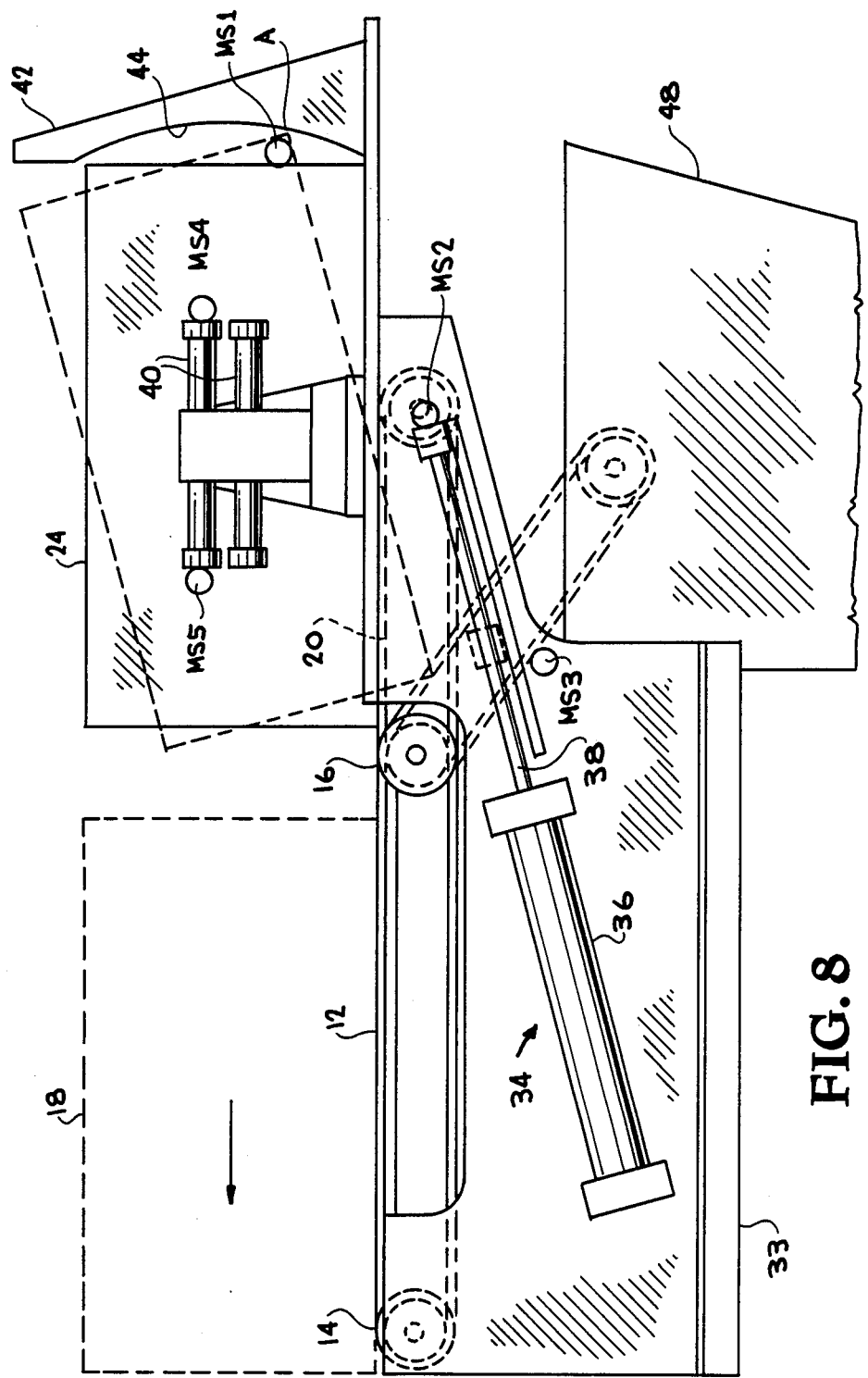
FIG. 8 is a more detailed side elevational view of the unloading mechanism with location of the microswitches (the cage device being shown rotated 165° in phantom).

In FIGS. 3-7 of the drawings, there are shown the sequence of operation of the automatic unloading mechanism of the present invention. FIG. 8 illustrates the location of microswitches MS#1 through MS#5 for controlling the overall operation of the unloading mechanism. Initially, the box 18 filled with the tubes to be unloaded automatically into the hopper 48 is fed along the endless conveyor belt 12, as is depicted in FIG. 3. As the drive rollers 14 and 16 are rotated in a first direction, the conveyor belt extension with its feed cables 31 serves to transport the box 18 into the cage device 24 and to activate the microswitch MS#1 located in the back side plate 26. This is illustrated in FIG. 4. When the microswitch MS#1 is energized, this will cause the microswitch MS#2 located on the upper end of the reciprocating rod 38 of the air cylinder actuator 34 to become energized. As a result, the reciprocating rods 38 on the respective air cylinders 36 will retract so as to pivot downwardly the roller 22 and the belt extension 20 in order to clear an area B and permit the rotation of the cage device 24 into the area B. This is shown in FIG. 5.

As the roller 22 descends, it will contact the microswitch MS#3 located on the lower end of the reciprocating rod 38 of the air cylinder actuator. Simultaneously, the microswitch MS#5 located on the left end (FIG. 8) of the rotary air cylinders will become energized. This will cause the cage device 24 to be rotated approximately 165° about the horizontal plane of the conveyor belt 12 in the counter-clockwise direction so as to unload the tubes out of the box 18 into the hopper 48. This is illustrated in FIGS. 6 and 7. As can be seen from FIG. 7 and the phantom lines of FIG. 8, the upper ends of the cage device and the box will come to rest and dwell for about 1-2 seconds on the points A of the guide members 42.

After the contents of the box have been dumped, the microswitch MS#4 located on the right end of the rotary air cylinder 40 is energized so as to rotate the cage device 165° in the clockwise direction back to its original position. At this time, the microswitch MS#5 is energized so as to cause the rollers 14 and 16 to rotate reversely in a second direction. In order to return the box 18 back to the conveyor belt 12. The microswitch MS#3 will be energized so as to cause the reciprocating rod 38 to become extended again and thus lifting the conveyor extension 20 back to its original position.

The automatic unloading mechanism has now completed its cycle and is ready for the next box filled with tubes to be unloaded. This cycle is repeated over and over in order to unload automatically all of the boxes. The command and sequencing of all of the microswitches may be controlled by a microprocessor (not shown) as should be apparent to those skilled in the art.

From the foregoing detailed description, it can thus be seen that the present invention provides an unloading mechanism for unloading automatically a box which includes a cage device adapted for rotation in order to unload the box into a hopper. Further, there is provided guide members for limiting the rotation of the cage device to be approximately 165°.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An unloading mechanism for unloading a box comprising:
    conveyor means including a conveyor belt extension for transporting a box to be unloaded;
    cage means for receiving the box to be unloaded from said conveyor means;
    means for pivoting downwardly said belt extension from a first horizontal position to a second position so as to permit rotation of said cage means; and
    means for rotating said cage means through approximately 165° in a first direction in order to unload the contents of the box into a hopper only when said conveyor belt extension is in the second position.

2. An unloading mechanism as claimed in claim 1, wherein said rotating means is used to rotate said cage means through 165° in a second direction in order to return said cage means to said first horizontal position.

3. An unloading mechanism as claimed in claim 2, wherein said conveyor means is adapted to remove the box after unloading from said cage means.

4. An unloading mechanism as claimed in claim 3, wherein said pivoting means is adapted to pivot upwardly in order to return said belt extension to said first horizontal position after unloading of the box.

5. An unloading mechanism as claimed in claim 2, wherein said rotating means comprises rotary air cylinders.

6. An unloading mechanism as claimed in claim 1, wherein said pivoting means comprises air cylinder actuators.

7. An unloading mechanism as claimed in claim 1, wherein said cage means comprises a unitary structure formed of a back side panel, a bottom side panel, and a pair of side panels, all being dimensioned so as to accommodate the box.

8. An unloading mechanism as claimed in claim 1, further comprising limiting means for limiting the rotational movement of said cage means to be approximately 165°.

9. An unloading mechanism as claimed in claim 8, wherein said limiting means comprises a pair of vertical members, each member having a concave cut-out portion, the lower end of said concave cut-out portion supporting the upper end of said cage means and said box in the upside down position.

10. An unloading mechanism for unloading a box comprising:
   an endless conveyor belt with a belt extension for transporting a box to be unloaded;
   a cage device operatively connected to said belt extension for receiving the box to be unloaded from the conveyor belt;
   air cylinder actuators operatively connected to said belt extension for pivoting downwardly said belt extension from a first horizontal position to a second position in order to permit rotation of said cage device; and
   rotary air cylinders operatively connected to said cage device for rotating said cage device through approximately 165° in a first direction in order to unload the contents of the box into a hopper only when said belt extension is in the second position.

11. An unloading mechanism as claimed in claim 10, wherein said rotary air cylinders are used to rotate said cage device through 165° in a second direction in order to return said cage device to said first horizontal position.

12. An unloading mechanism as claimed in claim 11, wherein said conveyor belt is adapted to remove the box after unloading from said cage device.

13. An unloading mechanism as claimed in claim 12, wherein said air cylinder actuators are adapted to pivot upwardly said belt extension in order to return said belt extension to said first horizontal position after unloading of the box.

14. An unloading mechanism as claimed in claim 10, wherein said cage device comprises a unitary structure formed of a back side panel, a bottom side panel, and a pair of side panels, all being dimensioned so as to accommodate the box.

15. An unloading mechanism as claimed in claim 10, further comprising limiting means for limiting the rotational movement of said cage device to be approximately 165°.

16. An unloading mechanism as claimed in claim 15, wherein said limiting means comprises a pair of vertical members, each member having a concave cut-out portion, the lower end of said concave cut-out portion supporting the upper end of said cage device and said box in the upside down position.

17. A method for unloading the contents of a box, said method comprising the steps of:
   transporting a box to be unloaded along a conveyor belt with a conveyor belt extension;
   receiving the box to be unloaded from the conveyor belt in a cage device;
   pivoting downwardly the conveyor belt extension from a first horizontal position to a second position so as to permit rotation of the cage device; and
   rotating the cage device through approximately 165° in a first direction in order to unload the contents of the box into a hopper only when said conveyor belt extension is in the second position.

18. A method as claimed in claim 17, further comprising the step of limiting the rotation of the cage device to be approximately 165°.

* * * * *